US012021226B2

(12) United States Patent
Amine et al.

(10) Patent No.: US 12,021,226 B2
(45) Date of Patent: Jun. 25, 2024

(54) CATHODE MATERIALS FOR SECONDARY BATTERIES (71) Applicants: UChicago Argonne, LLC, Chicago, IL (US); Bayerische Motoren Werke Aktiengesellschaft, Munich (DE)

(72) Inventors: Khalil Amine, Oakbrook, IL (US); Xiaoqiao Zeng, Naperville, IL (US); Zonghai Chen, Bolingbrook, IL (US); Filippo Maglia, Munich (DE)

(73) Assignees: UCHICAGO ARGONNE, LLC, Chicago, IL (US); BAYERISCHE MOTOREN WERKE AKTIENGESELLSCHAFT, Munich (DE)

( * ) Notice: Subject to any disclaimer, the term of this patent is extended or adjusted under 35 U.S.C. 154(b) by 430 days.

(21) Appl. No.: 15/640,100

(22) Filed: Jun. 30, 2017

(65) Prior Publication Data

US 2019/0006662 A1   Jan. 3, 2019

(51) Int. Cl.
*H01M 4/36*   (2006.01)
*H01M 4/02*   (2006.01)
*H01M 4/04*   (2006.01)
*H01M 4/131*  (2010.01)
*H01M 4/48*   (2010.01)
*H01M 4/505*  (2010.01)
*H01M 4/525*  (2010.01)
*H01M 4/62*   (2006.01)
*H01M 10/0525* (2010.01)

(52) U.S. Cl.
CPC ......... *H01M 4/366* (2013.01); *H01M 4/0471* (2013.01); *H01M 4/131* (2013.01); *H01M 4/483* (2013.01); *H01M 4/505* (2013.01); *H01M 4/525* (2013.01); *H01M 10/0525* (2013.01); *H01M 2004/028* (2013.01); *H01M 4/625* (2013.01)

(58) Field of Classification Search
CPC ...... H01M 4/131; H01M 4/366; H01M 4/483; H01M 4/505; H01M 4/525; H01M 2004/028
See application file for complete search history.

(56) References Cited

U.S. PATENT DOCUMENTS

| | | | |
|---|---|---|---|
| 7,748,497 B2 | 7/2010 | Tolliver et al. | |
| 7,968,235 B2 | 6/2011 | Amine et al. | |
| 9,012,096 B2 | 4/2015 | Amine et al. | |
| 2012/0028134 A1* | 2/2012 | Kim | H01M 4/364 429/342 |
| 2014/0087261 A1* | 3/2014 | Li | H01M 4/485 429/223 |
| 2015/0104708 A1* | 4/2015 | Bi | H01M 4/525 429/220 |

(Continued)

Primary Examiner — Brittany L Raymond
(74) Attorney, Agent, or Firm — Foley & Lardner LLP (57) ABSTRACT An active cathode material containing particles with a core containing a lithium transition metal oxide, each core at least partially encapsulated by a layer including the lithium transition metal oxide and dopant cation; and an outer layer containing metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle.

9 Claims, 2 Drawing Sheets

(56) References Cited

U.S. PATENT DOCUMENTS

2016/0006032 A1\* 1/2016 Paulsen ................. C01G 51/42
                                                                                             429/220
2016/0141602 A1 5/2016 Parans Paranthaman et al.
2016/0164092 A1 6/2016 Stottlemyer et al.

\* cited by examiner

CATHODE MATERIALS FOR SECONDARY BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to cathode materials for lithium-ion batteries or sodium-ion batteries, and methods to prepare secondary batteries containing the same. More specifically, the present technology is related to cathode materials with surface doping and an outer coating, which improves the performance of lithium-ion batteries using such cathode materials.

BACKGROUND

Lithium or sodium batteries are two classes of electrochemical energy storage devices. These devices contain a cathode (positive electrode), an anode (negative electrode), and an electrolyte filling the space between the electrically insulated cathode and anode.

SUMMARY

Provided herein, in one aspect, are active cathode materials containing particles with a core containing a lithium transition metal oxide, each core at least partially encapsulated by a layer containing the lithium transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle. In some embodiments, the lithium transition metal oxide contains $LiNi_xCo_yMn_{1-x-y}O_2$, wherein $0 \le x \le 1$, $0 \le y \le 1$, and $0 \le x+y \le 1$. In some embodiments, the dopant cation is Ti. In some embodiments, the metal oxide of the outer layer contains $Al_2O_3$, $ZrO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $CuO$, $ZnO$, or any combination of two or more thereof. In some embodiments, the metal oxide of the outer layer is $TiO_2$. In some embodiments, the lithium transition metal oxide does not contain Al, Ti, Sn, Mg, Zr, Cu, Fe, Ca, W, Ga, Sc, Y, La, Hf, V, In, Nb, or Ta.

Provided herein, in another aspect, are cathodes containing the active cathode material described herein. In some embodiments, the cathode further includes a current collector, a conductive carbon material, a binder, or any combination thereof.

Provided herein, in another aspect, are electrochemical devices containing the cathode described herein. In some embodiments, the electrochemical device is a lithium battery. In some embodiments, the electrochemical device is a lithium-ion battery. In some embodiments, the electrochemical device further includes an anode, a separator, and a non-aqueous electrolyte. In some embodiments, the anode contains a current collector, a conductive carbon material, a binder, or any combination thereof.

Provided herein, in another aspect, are methods to prepare an active cathode material, the method including mixing particles of a lithium transition metal oxide and a dopant precursor in a solvent to prepare a dispersion; filtering the dispersion to obtain solid material; and heating the solid material at a temperature of between 50° C. and 950° C. to form the active cathode material; wherein the active cathode material contains particles with a core of the lithium transition metal oxide, each core at least partially encapsulated by a layer containing the lithium transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle. In some embodiments, the lithium transition metal oxide core contains $LiNi_xCo_yMn_{1-x-y}O_2$, wherein $0 \le x \le 1$, $0 \le y \le 1$, and $0 \le x+y \le 1$. In some embodiments, the dopant cation is Ti. In some embodiments, the metal oxide of the outer layer contains $Al_2O_3$, $ZrO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $CuO$, $ZnO$, or any combination of two or more thereof. In some embodiments, the metal oxide of the outer layer is $TiO_2$. In some embodiments, the lithium transition metal oxide does not contain Al, Ti, Sn, Mg, Zr, Cu, Fe, Ca, W, Ga, Sc, Y, La, Hf, V, In, Nb, or Ta.

Provided herein, in another aspect, are active cathode materials prepared according to the methods disclosed herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

During the charging process of a secondary battery, lithium/sodium ions are removed from the cathode, transported through the electrolyte, and are inserted into the anode, while electrons are removed from the cathode and injected into the anode through an external circuit (charger). During the use (discharge) of a secondary battery, lithium/sodium ions are removed from the anode, transported through the electrolyte, and are inserted into the cathode, while electrons flow through an external circuit to provide electric work.

In a typical lithium/sodium-ion battery, the dominant cathode materials are lithium transition metal oxides or sodium transition metal oxides. During the charging/discharging of the lithium/sodium-ion battery, the delithiated or desodiated cathode material can slowly react with the non-aqueous electrolyte, leading to a gradual degradation of electrochemical performance of lithium/sodium-ion batteries using such materials. In one aspect, the technology presented herein addresses this problem by providing active cathode materials wherein dopant cation is introduced into a thin surface layer of the materials. The materials further include an outer layer containing metal oxide. Such materials exhibit higher stability than their counterparts devoid of the dopant and outer layer, thereby improving the performance of the lithium/sodium-ion battery.

Provided herein are active cathode materials containing particles with a core containing an alkali transition metal oxide, each core at least partially encapsulated by a layer containing the alkali transition metal oxide and dopant cation; and an outer layer including metal oxide. In some embodiments, the alkali transition metal oxide is lithium transition metal oxide or sodium transition metal oxide.

Active cathode materials may contain particles with a core containing an alkali transition metal oxide, each core at least partially encapsulated by a layer containing the alkali transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle. In some embodiments, the alkali transition metal oxide is lithium transition metal oxide or sodium transition metal oxide.

The active cathode materials may contain particles with a core containing a lithium transition metal oxide, each core at least partially encapsulated by a layer containing the lithium transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle.

The active cathode materials may contain particles with a core containing a sodium transition metal oxide, each core at least partially encapsulated by a layer containing the sodium transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle.

The active cathode material may contains particles with a core containing a lithium transition metal oxide. In some embodiments, the lithium transition metal oxide contains $LiNi_xCo_yMn_{1-x-y}O_2$, wherein $0 \leq x \leq 1$, $0 \leq y \leq 1$, and $0 \leq x+y \leq 1$. In some embodiments, the lithium transition metal oxide contains $LiNi_{0.6}Mn_{0.2}Co_{0.2}O_2$. In some embodiments, the lithium transition metal oxide does not include Al, Ti, Sn, Mg, Zr, Cu, Fe, Ca, W, Ga, Sc, Y, La, Hf, V, In, Nb, or Ta. In some embodiments, the lithium transition metal oxide does not contain Ti.

The dopant cation includes, consists essentially of, or consists of Al, Ti, Sn, Mg, Zr, Cu, Fe, Ca, W, Ga, Sc, Y, La, Hf, V, In, Nb, Ta, or a combination of two or more thereof. In some embodiments, the dopant cation includes, consists essentially of, or consists of Ti.

The dopant cation may be present in an amount of 10 wt. % or less of the particle. This includes about 10.0, 9.0, 8.0, 7.0, 6.0, 5.0, 4.0, 3.0, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, or 0.001 wt. %, including increments therein. In some embodiments, the dopant cation is present in an amount of about 0.001 wt. % to about 10 wt. % of the particle. This includes ranges of about 0.01 wt. % to about 2.0 wt. %, about 0.3 wt. % to about 2.0 wt. %, about 0.5 wt. % to about 2.0 wt. %, about 0.3 wt. % to about 1.8 wt. %, about 0.5 wt. % to about 1.5 wt. %, about 0.5 wt. % to about 1.0 wt. %, and about 0.1 wt. % to about 1.0 wt. % of the particle. In some embodiments, the dopant cation is present in an amount of about 2 wt. % or less of the particle. In some embodiments, the dopant cation is present in an amount of about 1 wt. % or less of the particle.

The metal oxide of the outer layer is selected from a group consisting of $Al_2O_3$, $ZrO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $CuO$, $ZnO$, and any combination of two or more thereof. In some embodiments, the metal oxide of the outer layer includes, consists essentially of, or consists of $TiO_2$.

The metal oxide of the outer layer may be present in an amount of 5 wt. % or less of the particle. This includes about 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, or 0.001 wt. %, including increments therein. In some embodiments, the metal oxide of the outer layer is present in an amount of about 0.001 wt. % to about 5 wt. % of the particle. This includes ranges of about 0.01 wt. % to about 2.0 wt. %, about 0.3 wt. % to about 2.0 wt. %, about 0.5 wt. % to about 2.0 wt. %, about 0.3 wt. % to about 1.8 wt. %, about 0.5 wt. % to about 1.5 wt. %, about 0.5 wt. % to about 1.0 wt. %, and about 0.1 wt. % to about 1.0 wt. % of the particle.

In some embodiments, the dopant cation includes, consists essentially of, or consists of Ti, and the metal oxide of the outer layer includes, consists essentially of, or consists of $TiO_2$.

In another aspect, provided herein are methods to prepare the active cathode material described herein. In some embodiments, the method includes mixing particles of a lithium transition metal oxide and a dopant precursor in a solvent to prepare a dispersion; filtering the dispersion to obtain solid material; and heating the solid material at a temperature of between 50° C. and 950° C. to form the active cathode material; wherein the active cathode material contains particles with a core of the lithium transition metal oxide, each core at least partially encapsulated by a layer containing the lithium transition metal oxide and dopant cation; and an outer layer including metal oxide; wherein the dopant cation is selected from the group consisting of Al, Ti, Sn, Mg, Zr, Cu, Fe, Ca, W, Ga, Sc, Y, La, Hf, V, In, Nb, Ta, and any combination of two or more thereof; and the dopant cation is present in an amount of 10 wt. % or less of the particle. In some embodiments, the dopant cation and the outer layer containing the metal oxide are introduced by depositing a dopant precursor on the surface of lithium transition metal oxide particles through a process selected from, but not limited to, sol-del process and a co-precipitation process, followed by a heat treatment at an elevated temperature. In some embodiments, the dopant precursor is deposited in an amount of about 0.001 wt. % to about 10 wt. % of the particles. This includes ranges of about 0.01 wt. % to about 2 wt. %, and about 0.1 wt. % to about 1 wt. % of the particles. In some embodiments, the heat treatment occurs at a temperature of about 50° C. to about 950° C. This includes temperatures of about 100° C. to about 600° C., about 150° C. to about 500° C., about 200° C. to about 500° C., about 300° C. to about 500° C., about 400° C. to about 500° C., and about 300° C. to about 600° C. In some embodiments, the heat treatment occurs at about 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, or 950° C., including increments therein.

In some embodiments, "partially encapsulated" refers to about or at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99%, including increments therein, of encapsulation.

In another aspect, provided herein are cathodes containing the active cathode material described herein. In some embodiments, the cathode further includes a current collector, a conductive carbon material, a binder, or any combination thereof. In some embodiments, the cathode is a composite film coated on a metal foil. In some embodiments, the metal foil is aluminum. In some embodiments, the composite film includes a binder, a conductive carbon material, and the active cathode material disclosed herein.

In another aspect, provided herein are electrochemical devices containing a cathode described herein. In some embodiments, the electrochemical device is a lithium battery. In some embodiments, the electrochemical device is a lithium-ion battery. In some embodiments, the electrochemical device is a sodium battery. In some embodiments, the electrochemical device is a sodium-ion battery.

The electrochemical devices may further contain an anode, a separator, and a non-aqueous electrolyte.

The anode includes an active negative electrode material. In some embodiments, the anode further includes a current collector, a conductive carbon material, a binder, or any combination thereof. In some embodiments, the anode is a composite film coated on a metal foil. In some embodiments, the metal foil is a copper. In some embodiments, the metal foil is aluminum. In some embodiments, the composite film includes a binder, a conductive carbon material, and an active negative electrode material.

When used, the binder may be present in the electrode in an amount of from about 0.1 wt. % to about 99 wt. %. In some embodiments, the binder is present in the electrode in an amount of from about 2 wt. % to about 20 wt. %. Illustrative binders include, but are not limited to, a group of polymers consisting of polyvinylidene difluoride (PVDF), poly(acrylic acid) (PAA), lithiated PAA, polyimide (PI), polyacrylonitrile (PAN), styrene-butadiene rubber (SBR), carboxymethyl cellulose (CMC), and any mixture of two or more polymers thereof. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), or a copolymer of any two or more such polymers.

Illustrative conductive carbon materials include, but are not limited to, graphite, graphene, expanded graphite, reduced graphene oxide, acetylene black, carbon black, a metal-organic framework, porous carbon, carbon spheres, carbon aerogel, single-walled carbon nanotubes, multi-walled carbon nanotubes, carbon nanofibers, carbon nanotube arrays, and any mixture of two or more thereof. Commercial examples of carbon black include, but are not limited to, TIMCAL Super C45®, Super-P®, Black Pearls® 2000, Denka Black®, Vulcan® XC72R, and Ketjenblack®.

Illustrative active negative electrode materials include, but are not limited to, graphite, amorphous carbon, hard carbon, soft carbon, $Li_4Ti_5O_{12}$, $M_{1-x}A_xLi_{2-y}B_yTi_{6-z}C_zO_{14-t}Q_t$, tin alloys, silicon alloys, intermetallic compounds, lithium metal, phosphorus, silicon-phosphorus composite, silicon-phosphorus-carbon composite, and any mixture of any two or more thereof. In such materials, M is selected from Ba, Sr, Ca, Mg, Pb, Sn and other divalent cations; $0 \leq x \leq 0.5$, $0 \leq y \leq 0.5$, $0 \leq z \leq 0.5$, $0 < t \leq 0.5$; each of A, B and C are independently at least one divalent, trivalent or tetravalent metal; and Q is a monovalent or divalent anion. Suitable graphitic materials include natural graphite, artificial graphite, graphitized mesocarbon microbeads, and graphite fibers, as well as other amorphous carbon materials. The negative electrode, or the material used to prepare the negative electrode may additionally be coated with a material such as $Al_2O_3$, $AlF_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, oxyfluorides, or a mixture of two or more of thereof.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen.

In some embodiments, the separator is a microporous polymer separator. Illustrative separators include, but are not limited to, Celgard® 2325, Celgard® 2400, Celgard® 3501, and a glass fiber separator.

In some embodiments, the non-aqueous electrolyte of the electrochemical device includes an alkali metal salt dissolved in a polar aprotic solvent. The alkali metal salt is typically present at a concentration of from about 0.5 to about 2 molar. This includes a concentration of about 0.5 M to about 1.5 M, about 0.8 M to about 2.0 M, and about 1.0 M to about 2.0 M. In some embodiments, the salt is present in the electrolyte at a concentration of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 M, including increments therein. In some embodiments, the alkali metal salt is a lithium salt or a sodium salt. Exemplary lithium salts include $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4(C_2O_4)$, $LiCF_3SO_3$, $LiN(CF_3SO_2)_2$, $LiC(CF_3SO_2)_3$, $LiN(SO_2C_2F_5)_2)$, lithium alkyl fluorophosphates, lithium bis(oxalato)borate (LiBOB), $LiBF_2(C_2O_4)$, $Li_2B_{12}X_{12-n}H_n$, $Li_2B_{10}X_{10-n}H_n$, and a mixture of any two or more such materials, where X is selected from OH, $OCH_3$, F, Cl, Br, or I, n is an integer from 0 to 12, and n' is an integer from 0 to 10. Exemplary sodium salts include $NaPF_6$, $NaBF_4$, $NaClO_4$, and any combination thereof. Illustrative solvents include, but are not limited to, ethylene carbonate (EC), ethyl methyl carbonate (EMC), dimethylcarbonate (DMC), diethylcarbonate (DEC), propylene carbonate (PC), dioloxane, g-butyrolactone, d-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ethers and fluoro esters, fluoroethylene carbonate, adiponitrile, and any combination of two or more thereof.

In some embodiments, the non-aqueous electrolyte includes an electrode stabilizing additive to protect the electrodes from degradation. See, e.g., co-pending U.S. application Ser. Nos. 10/857,365, 11/279,120, and provisional application no. 60/647,361, which are incorporated by reference herein in their entirety. Thus, the electrolyte may include an electrode stabilizing additive that can be reduced or polymerized on the surface of a negative electrode to form a passivation film on the surface of the negative electrode. Likewise, electrolytes can include an electrode stabilizing additive that can be oxidized or polymerized on the surface of the positive electrode to form a passivation film on the surface of the positive electrode.

In some embodiments, the electrolyte includes mixtures of two types of electrode stabilizing additives. The additives are typically present at a concentration of about 0.001 wt. % to about 8 wt. %. In some embodiments, an electrode stabilizing additive is a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)-cyclotriphosphazene, (diaryloxy)(trifluoro)(methoxy)cyclotriphosphazene compounds, or a mixture of two or more such compounds. In some embodiments, the electrode stabilizing additive is vinyl ethylene carbonate, vinyl carbonate, or 1,2-diphenyl ether, or a mixture of any two or more such compounds.

Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxypyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyltetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryl oxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene, or a mixture of any two or more such compounds.

In other embodiments, electrode stabilizing additives include substituted or unsubstituted spirocyclic hydrocarbons containing at least one oxygen atom and at least one alkenyl or alkynyl group. For example, such stabilizing additives include those having Formula X:

X wherein $A^1$, $A^2$, $A^3$, and $A^4$ are independently O or $CR^{12}R^{13}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^{12}R^{13}$; provided that $G^1$ is not O when $A^1$ is O, $G^2$ is not O when $A^2$ is O, $G^3$ is not O when $A^3$ is O, and $G^4$ is not O when $A^4$ is O; $R^{10}$ and $R^{11}$ are independently a substituted or unsubstituted divalent alkenyl or alkynyl group; and $R^{12}$ and $R^{13}$ at each occurrence are independently H, F, Cl, or a substituted or an unsubstituted alkyl, alkenyl, or alkynyl group.

Representative examples of Formula X include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or a mixture of any two or more such compounds. Furthermore, mixtures of any two or more electrode stabilizing additives may also be used in the electrolytes of the present invention.

In some embodiments, the electrode stabilizing additive is an anion receptor. In some embodiments, the anion receptor is a Lewis acid. In other embodiments, the anion receptor is a borane, a boronate, a borate, a borole, or a mixture of any two or more such compounds.

In some embodiments, the anion receptor is a compound of the Formula XI:

XI where, each $R^{14}$, $R^{15}$, and $R^{16}$ are independently halogen, alkyl, aryl, halogen-substituted alkyl, halogen-substituted aryl, or $OR^{17}$; or any two of $R^{14}$, $R^{15}$, $R^{16}$, and $R^{17}$, together with the atoms to which they are attached, form a heterocyclic ring having 5-9 members, and $R^{17}$ is at each occurrence independently alkyl, aryl, halogen-substituted alkyl, or halogen-substituted aryl. In some such embodiments, $R^{14}$, $R^{15}$, and $R^{16}$ are independently halogen, alkyl, aryl, halogen-substituted alkyl, or halogen-substituted aryl; or any two of $R^{14}$, $R^{15}$, and $R^{16}$, together with the boron to which they are attached, form a heterocyclic ring having 5-9 members.

In some embodiments, the anion receptors include, but not limited to, tri(propyl)borate, tris(1,1,1,3,3,3-hexafluoropropan-2-yl)borate, tris(1,1,1,3,3,3-hexafluoro-2-phenylpropan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more thereof. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-di oxaborolane, 2-pentafluorophenyl-4,4,5,5-tetrakis(trifluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoroisopropyl)pentafluorophenylboronate, or a mixture of any two or more such compounds.

In another aspect, provided herein are methods to prepare a cathode disclosed herein.

In another aspect, provided herein are methods to prepare an electrochemical device disclosed herein.

The present invention, thus generally described, will be understood more readily by reference to the following examples, which are provided by way of illustration and are not intended to be limiting of the present invention.

EXAMPLES

Example 1

Stoichiometric amounts of titanium butoxide Ti(OBu)$_4$ (0.171 g) and LiNi$_{0.6}$Mn$_{0.2}$Co$_{0.2}$O$_2$ powder (19.96 g) were mixed and dispersed in pure ethanol solvent (80 mL) with strong stirring for 2 hours. Stoichiometric amount of water (10 mL) was dissolved in pure ethanol (20 mL); the pH value was adjusted to ~4-5 with acid. The acidic solution was slowly dropped into the LiNi$_{0.6}$Mn$_{0.2}$Co$_{0.2}$O$_2$/Ti(OBu)$_4$ mixture to react with Ti(OBu)$_4$, followed by filtration and slow evaporation of solvent at 100° C. The obtained coated precursor was further heat treated at 500° C. for 5 h. The obtained powder is a non-limiting example of active cathode material with an equivalent of 0.2 wt. % TiO$_2$ coating/Ti doping.

Example 2

Stoichiometric amounts of titanium butoxide Ti(OBu)$_4$ (0.428 g) and LiNi$_{0.6}$Mn$_{0.2}$Co$_{0.2}$O$_2$ powder (19.9 g) were mixed and dispersed in pure ethanol solvent (80 mL) with strong stirring for 2 hours. Stoichiometric amount of water (10 mL) was dissolved in pure ethanol (20 mL); the pH value was adjusted to ~4-5 with acid. The acidic solution was slowly dropped into the $LiNi_{0.6}Mn_{0.2}Co_{0.2}O_2/Ti(OBu)_4$ mixture to react with $Ti(OBu)_4$, followed by filtration and slow evaporation of solvent at 100° C. The obtained coated precursor was further heat treated at 500° C. for 5 h. The obtained powder is a non-limiting example of active cathode material with an equivalent of 0.5 wt. % $TiO_2$ coating/Ti doping.

Example 3

Stoichiometric amounts of titanium butoxide $Ti(OBu)_4$ (0.856 g) and $LiNi_{0.6}Mn_{0.2}Co_{0.2}O_2$ powder (19.8 g) were mixed and dispersed in pure ethanol solvent (80 mL) with strong stirring for 2 hours. Stoichiometric amount of water (10 mL) was dissolved in pure ethanol (20 mL); the pH value was adjusted to ~4-5 with acid. The acidic solution was slowly dropped into the $LiNi_{0.6}Mn_{0.2}Co_{0.2}O_2/Ti(OBu)_4$ mixture to react with $Ti(OBu)_4$, followed by filtration and slow evaporation of solvent at 100° C. The obtained coated precursor was further heat treated at 500° C. for 5 h. The obtained powder is a non-limiting example of active cathode material with an equivalent of 1.0 wt. % $TiO_2$ coating/Ti doping.

Example 4

Figure 1:
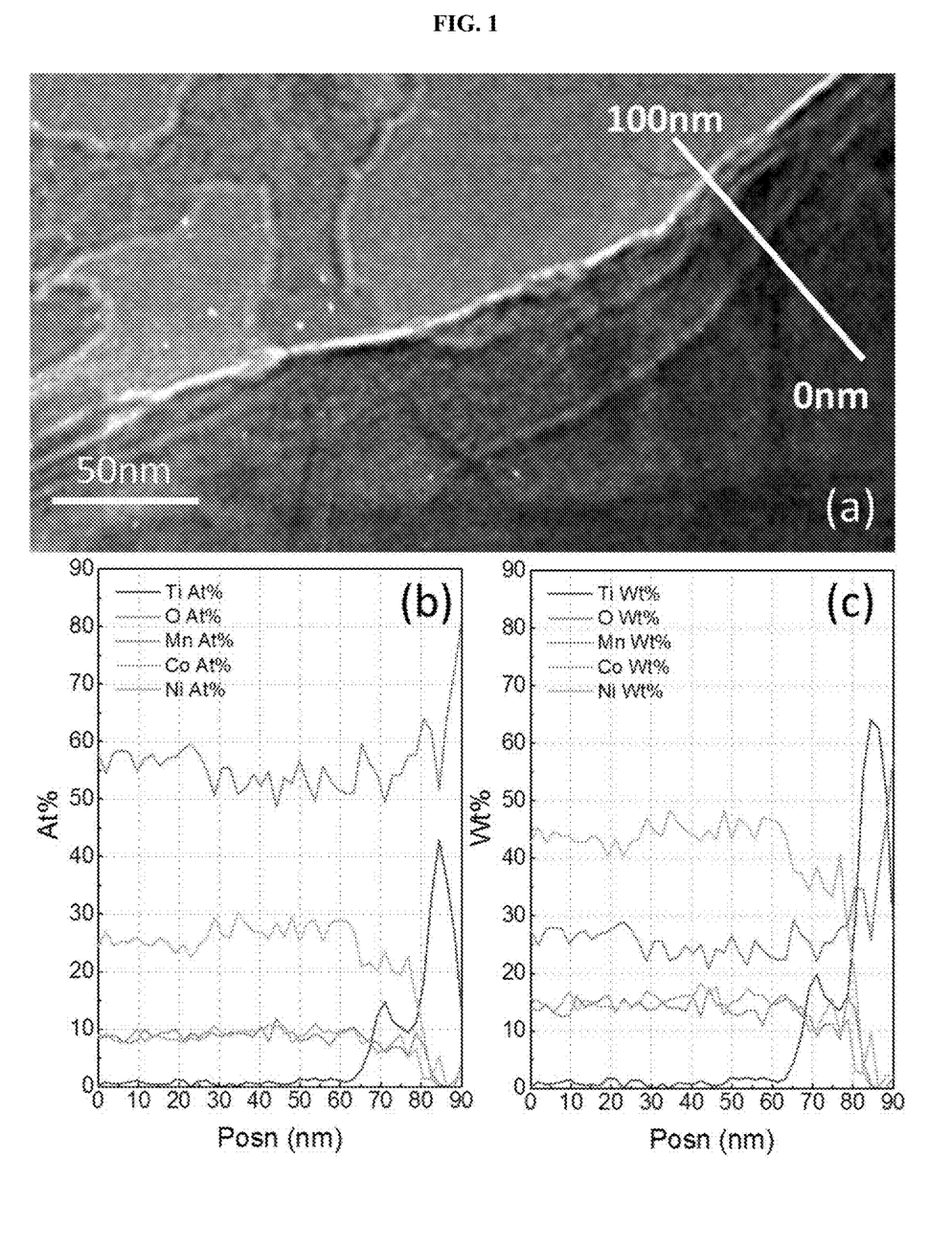
FIG. 1 depicts (a) a scanning transmission electron microscopy (STEM) image of a surface of a particle of $LiNi_{0.6}Mn_{0.2}Co_{0.2}O_2$, with an equivalent of 1 wt. % $TiO_2$ coating/Ti doping along with graphic representation of (b) atomic ratio, and (c) weight ratio along the energy dispersive x-ray spectroscopy (EDX) scanning line shown in the STEM image (a).

FIG. 1 depicts an STEM image of $LiNi_{0.6}Mn_{0.2}Co_{0.2}O_2$ with an equivalent of 1 wt. % $TiO_2$ coating/Ti doping. The elemental analysis along a scanning line across the particle surface illustrated the concentration profiles of different elements in the surface region of the particle (see FIG. 1). Two peaks on the concentration profile of Ti were observed, with one corresponding to a $TiO_2$ outer coating on the surface, and the other at the surface of the particle underneath the $TiO_2$ outer coating, corresponding to the doping of Ti into the surface of the lithium transition metal oxide particle.

Example 5

Table 1 depicts the measured activation energy of parasitic reactions between the delithiated cathode materials with the non-aqueous electrolyte (1.0 M $LiPF_6$ in a mixture solvent of ethylene carbonate and ethyl methyl carbonate with a mass ratio of 3:7). The cathodes containing the active cathode material of the present technology have substantially higher activation energies than that for the control cathodes (which do not contain the active cathode material of the present technology), suggesting an improved stability for the materials with both surface doping and an outer coating of metal oxide.

TABLE 1

Measured activation energy (kJ/mol) of parasitic reactions between the delithiated cathodes ($LiNi_{0.6}Mn_{0.2}Co_{0.2}O_2$) and the non-aqueous electrolyte (1.0M $LiPF_6$ in EC/EMC, 3:7)

| Voltage Window (V) | pristine* | 0.5 wt. % $TiO_2$ | 1.0 wt. % $TiO_2$ |
|---|---|---|---|
| 4.3-2.8 | 41.9 | 43.6 | 47.6 |
| 4.4-2.8 | 43.7 | 46.6 | 50.5 |
| 4.45-2.8 | 46.0 | 45.5 | 48.7 |
| 4.5-2.8 | 47.2 | 44.7 | 47.3 |

*control cathode

Example 6

Figure 2:
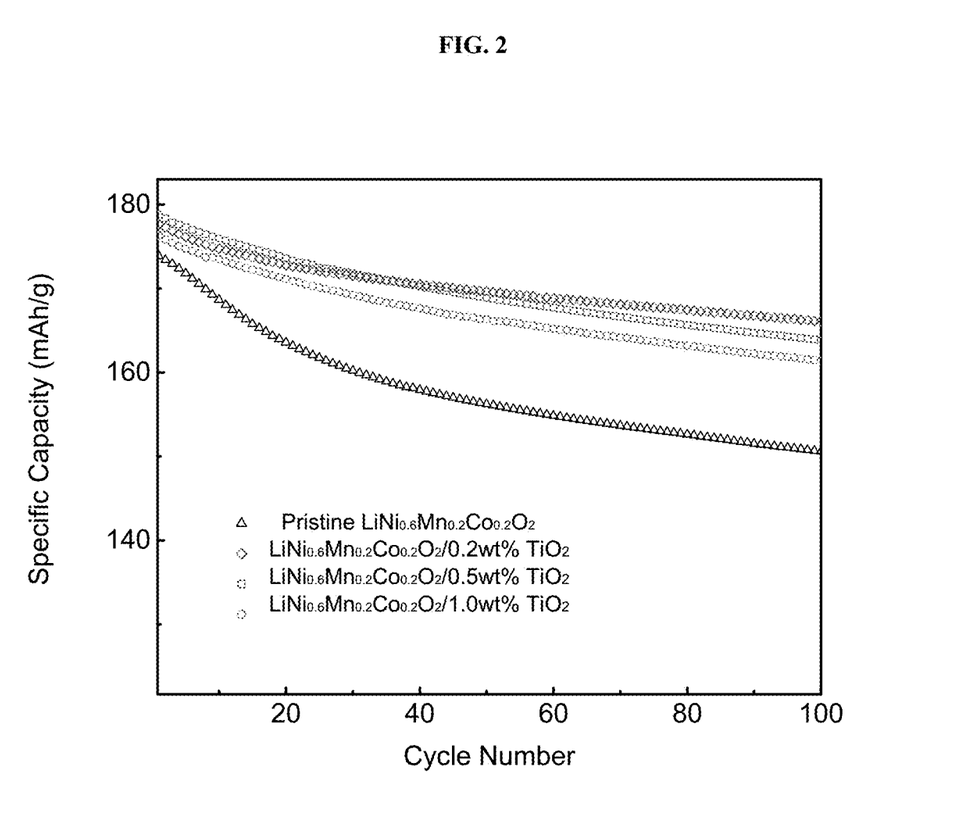
FIG. 2 depicts discharge capacity of full cells using graphite as the anode. The cathodes are $LiNi_{0.6}Mn_{0.2}Co_{0.2}O_2$ with or without titanium doping and an outer coating of $TiO_2$.

FIG. 2 depicts the discharge capacity of lithium-ion cells using graphite as the anode. The cathode materials used for these cells include pristine $LiNi_{0.6}Mn_{0.2}Co_{0.2}O_2$ (control cathodes) and $LiNi_{0.6}Mn_{0.2}Co_{0.2}O_2$ with both surface doping and an outer coating of metal oxide. The cells were cycled with a constant current of 1 C at 30° C. between 2.7 V and 4.3 V. It was demonstrated that the cathode containing active cathode material of the present technology had a better electrochemical performance than the control cathode.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or devices which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least,"

"greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An active cathode material comprising particles with a core comprising a lithium transition metal oxide, each core at least partially encapsulated by a layer comprising the lithium transition metal oxide and a dopant cation; and
   an outer layer that is $TiO_2$;
   wherein:
   the dopant cation is Ti;
   the dopant cation is present in an amount of 10 wt. % or less of the particle; and
   the lithium transition metal oxide is $LiNi_xCo_yMn_{1-x-y}O_2$, wherein $0 \leq x \leq 1$, $0 \leq y \leq 1$, and $0 \leq x+y \leq 1$.

2. A cathode comprising the active cathode material of claim 1.

3. The cathode of claim 2, further comprising a current collector, a conductive carbon material, a binder, or any combination thereof.

4. An electrochemical device comprising the cathode of claim 2.

5. The electrochemical device of claim 4, wherein the electrochemical device is a lithium battery.

6. The electrochemical device of claim 4, wherein the electrochemical device is a lithium-ion battery.

7. The electrochemical device of claim 4, wherein the electrochemical device further comprises an anode, a separator, and a non-aqueous electrolyte.

8. The electrochemical device of claim 7, wherein the anode comprises a current collector, a conductive carbon material, a binder, or any combination thereof.

9. An active cathode material comprising particles with a core consisting of a lithium transition metal oxide, each core at least partially encapsulated by a layer consisting of the lithium transition metal oxide and a dopant cation; and
   an outer layer consisting of $TiO_2$;
   wherein:
   the dopant cation is Ti;
   the dopant cation is present in an amount of 0.01 wt % to 2 wt. % of the particle; and
   the lithium transition metal oxide is $LiNi_xCo_yMn_{1-x-y}O_2$, wherein $0 \leq x \leq 1$, $0 \leq y \leq 1$, and $0 \leq x+y \leq 1$.

* * * * *